No. 760,865. PATENTED MAY 24, 1904.
J. T. HOGAN.
CUTTER AND CUTTING MECHANISM FOR BUTTONHOLE SEWING MACHINES.
APPLICATION FILED NOV. 17, 1903.
NO MODEL.
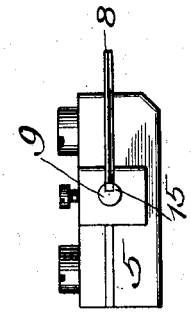
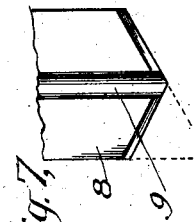
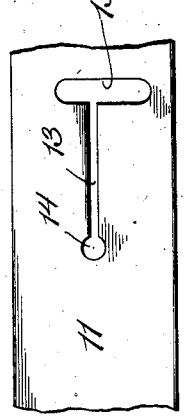
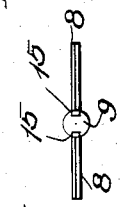
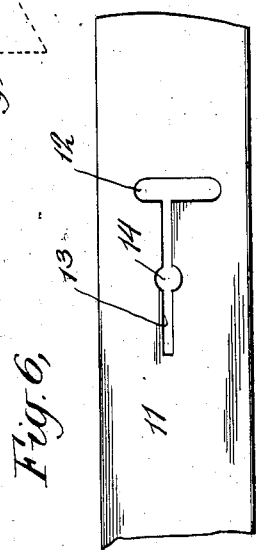
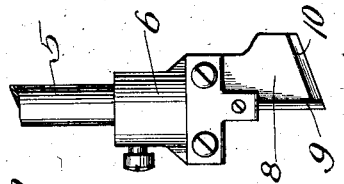
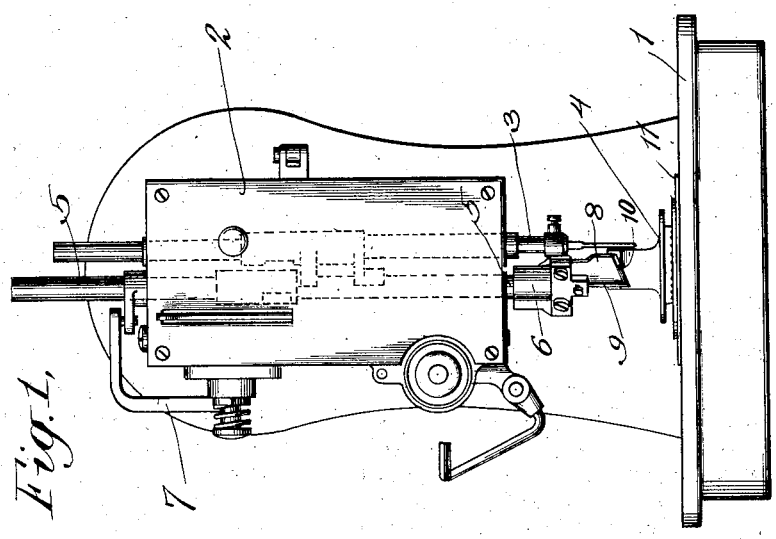
WITNESSES:
Edgar J. Williams
H. Crocheron
INVENTOR
James T. Hogan
BY
Chapin Hayward Marble
his ATTORNEYS No. 760,865.

Patented May 24, 1904.

UNITED STATES PATENT OFFICE.

JAMES T. HOGAN, OF JERSEY CITY, NEW JERSEY, ASSIGNOR TO THE NATIONAL MACHINE COMPANY, OF MAMARONECK, NEW YORK, A CORPORATION OF NEW YORK.

CUTTER AND CUTTING MECHANISM FOR BUTTONHOLE-SEWING MACHINES.

SPECIFICATION forming part of Letters Patent No. 760,865, dated May 24, 1904.

Application filed November 17, 1903. Serial No. 181,467. (No model.)

*To all whom it may concern:*

Be it known that I, JAMES T. HOGAN, a citizen of the United States of America, and a resident of Jersey City, county of Hudson, State of New Jersey, have invented certain new and useful Improvements in Cutters and Cutting Mechanism for Buttonhole-Sewing Machines, of which the following is a specification, reference being had to the accompanying drawings, forming a part thereof.

My invention relates to improvements in cutters and cutting mechanism for buttonhole-sewing machines, and particularly to means for cutting a buttonhole-slit having an enlarged portion, such as in an eyelet-ended buttonhole.

I will describe a cutter and cutting mechanism embodying my invention and will then point out the novel features in claims.

In the drawings, Figure 1 is an end view of a buttonhole-sewing machine, showing a cutter and cutting mechanism embodying my invention. Fig. 2 is a detail view of the cutter and cutter-holder. Fig. 3 is an end view of the same. Fig. 4 is a top view of a portion of the throat-plate, showing the cutter-slot. Fig. 5 is a detail end view of a modified form of cutter. Fig. 6 is a top view of a portion of the throat-plate, having a cutter-slot arranged to receive the form of cutter shown in Fig. 5. Fig. 7 is a detail view in elevation of the form of cutter shown in Fig. 5, showing the same in full lines with its cutting edge in two different planes, both at an angle other than a right angle with the plane or movement of the cutter in a cutting operation, and showing also in dotted lines the cutting edge in but one plane.

In the drawings I have shown an ordinary form of buttonhole-sewing machine having the usual bed 1 and overhanging arm terminating in a front head 2. The needle-bar 3 is mounted in the front head and may be operated by the usual mechanism for stitching. The usual form of work-clamp for holding the material to be stitched is shown at 4.

A cutter-bar 5 is mounted to reciprocate in the head 2 and is provided at its lower end with a cutter-carrying clamp 6. The cutter 5 is mounted in the head 2 at the rear of the needle-bar 3 and substantially in a line therewith and is arranged to be reciprocated at the proper time for a cutting operation. A cutter-controller 7 engages the cutter-bar and at the desired moment revolves same, so as to bring the cutter and cutter-bar into cutting position and at the same time causes said cutter-bar to be engaged by the needle-bar or a portion operating therewith, so that upon a predetermined reciprocation of the needle-bar the cutter-bar will be reciprocated therewith.

Mechanism for accomplishing the foregoing is well known in the art, and hence it is unnecessary to describe or illustrate the same in detail herein. Mechanism such as is illustrated in United States Letters Patent No. 402,610 and No. 742,492, dated, respectively, May 7, 1889, and October 27, 1903, may be employed for this purpose, such portion of the mechanism illustrated herein being of the type shown in the said Letters Patent.

The cutter-carrying clamp 6 supports and carries the cutter, which comprises a knife-blade portion 8 and an enlarged longitudinal rib or punch portion 9. The knife-blade portion 8 is beveled at the end on both of its sides, as at 10, to a sharp knife-blade point, while the rib 9 terminates in a shearing edge. The punch and knife-blade portions are preferably constructed as separate and separable pieces connected and secured together by the clamp 6, as shown. Further, the punch portion is preferably provided with a longitudinal recess, to which the knife-blade portion is fitted, as shown at 15 in the drawings. A throat-plate 11 is supported by the bed 1 in the usual or any desired manner and is provided with a needle-hole 12 and with a cutter-slot 13. The cutter-slot 13 opens into the needle-hole 12 and projects rearwardly therefrom. The cutter-slot is provided with an enlarged portion 14, fitted to the longitudinal rib or punch portion 9 of the cutter, and the said enlarged portion 14 acts as a die in combination with the said punch portion during a cutting operation.

In operation the cutter is moved by the cutter-controller into cutting position either at the commencement or at the end of the operation of stitching around the buttonhole and when in such position is given a reciprocatory movement, the said cutter being received within the cutter-slot in the throat-plate during such movement and cutting the material supported thereon as it enters the said slot.

The cutting edge of the cutter is arranged in a plane at an angle other than a right angle to the plane of movement of the cutter, so that the cutting edge operates progressively upon the material to be cut. In other words, the cutting edge of the knife enters the throat-plate at an angle to its upper surface.

In Figs. 5 and 6 I have shown a cutting-knife and cutter-slot adapted to cut a button-hole-slit having an enlarged portion intermediate its ends, and in Fig. 7 I have shown the form of cutter employed for such operation as having a cutting edge in two planes at an angle to each other in full lines, while in dotted lines I have shown the cutting edge in but a single plane, as in the cutter shown in Figs. 1 and 2.

By the employment of a cutter and throat-plate constructed in accordance with my invention I am enabled simply and efficiently to cut an eyelet-ended buttonhole or other buttonhole having an enlarged portion during sewing operation and while the work is held in sewing position.

What I claim is—

1. In cutting mechanism for sewing-machines, the combination with a cutter comprising two separate and separable members, one a substantially cylindrical punch, and the other a cutting blade or knife, and clamping means for supporting said punch and cutting-knife and securing them together, of a throat-plate having a cutter-slot therein for receiving the cutter during a cutting operation.

2. In cutting mechanism for sewing-machines, the combination with a cutter comprising two separate and separable members, one a substantially cylindrical punch, and the other a cutting blade or knife, the cutting blade or knife beveled to a cutting edge upon both of its sides, and the cutting edge of both said cutter portions arranged at an angle other than a right angle to the plane of movement of the cutter during a cutting operation, and clamping means for supporting said punch and cutting-knife and securing them together, of a throat-plate having a cutter-slot therein for receiving the cutter during a cutting operation.

3. In cutting mechanism for sewing-machines, the combination with a cutter comprising a substantially cylindrical punch portion having a longitudinal groove, and a cutting blade or knife fitted to said groove, and clamping means for supporting said punch and cutting-knife and securing them together, of a throat-plate having a cutter-slot therein for receiving the cutter during a cutting operation.

4. In cutting mechanism for sewing-machines, the combination with a cutter comprising a substantially cylindrical punch portion and a cutting blade or knife portion extending laterally from the punch portion, and means for supporting and reciprocating same, of a throat-plate having a cutter-slot therein for receiving the cutter during a cutting operation, said cutter-slot having parallel sides substantially throughout its length, to which the knife portion of the cutter is fitted, and terminating at one end in a substantially cylindrical orifice of a diameter greater than the width of the slot between its parallel sides, to which the punch portion of the cutter is fitted.

JAMES T. HOGAN.

Witnesses:
C. F. CARRINGTON,
V. HAMMELL.